US011442649B2

(12) United States Patent
Zhang et al.

(10) Patent No.: US 11,442,649 B2
(45) Date of Patent: Sep. 13, 2022

(54) MIGRATING DATA FROM A LARGE EXTENT POOL TO A SMALL EXTENT POOL

(71) Applicant: International Business Machines Corporation, Armonk, NY (US)

(72) Inventors: Hui Zhang, Shanghai (CN); Clint A. Hardy, Tucson, AZ (US); Karl A. Nielsen, Tucson, AZ (US); Matthew J. Kalos, Tucson, AZ (US); Qiang Xie, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/129,458

(22) Filed: Dec. 21, 2020

(65) Prior Publication Data

US 2021/0109670 A1  Apr. 15, 2021

Related U.S. Application Data

(62) Division of application No. 16/258,211, filed on Jan. 25, 2019, now Pat. No. 11,016,691.

(51) Int. Cl.
*G06F 3/06* (2006.01)

(52) U.S. Cl.
CPC ............ *G06F 3/0647* (2013.01); *G06F 3/061* (2013.01); *G06F 3/067* (2013.01); *G06F 3/0644* (2013.01); *G06F 3/0685* (2013.01)

(58) Field of Classification Search
CPC ...... G06F 3/0647; G06F 3/067; G06F 3/0685; G06F 3/061; G06F 3/0644

(Continued)

(56) References Cited

U.S. PATENT DOCUMENTS 5,920,703 A ‡ 7/1999 Campbell ............... H04L 29/06
                                                        709/23
7,970,991 B2 ‡ 6/2011 Abe ...................... G06F 3/0608
                                                        711/11

(Continued)

FOREIGN PATENT DOCUMENTS

CN       1696913 A  ‡ 11/2005  ........... G06F 3/0635
CN       1696913 A    11/2005

(Continued)

OTHER PUBLICATIONS

Non-Final Office Action from U.S. Appl. No. 16/118,367, dated Jun. 25, 2020.‡

(Continued)

*Primary Examiner* — Hua J Song
(74) *Attorney, Agent, or Firm* — Zilka-Kotab, P.C.

(57) ABSTRACT

A method according to one embodiment includes identifying a request to migrate data associated with a volume from a source storage pool to a destination storage pool, identifying volume segment table (VST) entries corresponding to rank extents within the source storage pool containing the data, allocating and synchronizing small VSTs for the identified VST entries within the volume, allocating one or more rank extents within the destination storage pool, transferring the data associated with the volume from the rank extents within the source storage pool containing the data to the one or more rank extents in the one or more ranks of the destination storage pool, updating the small VSTs to correspond to the transferred data in the one or more rank extents in the one or more ranks of the destination storage pool, and freeing the data from the one or more rank extents within the source storage pool.

14 Claims, 9 Drawing Sheets

(58) Field of Classification Search
USPC .......................................................... 711/165
See application file for complete search history.

(56) References Cited

U.S. PATENT DOCUMENTS

| | | | | |
|---|---|---|---|---|
| 8,019,965 | B2 ‡ | 9/2011 | Agombar | G06F 3/0647 |
| | | | | 711/20 |
| 8,719,533 | B2 ‡ | 5/2014 | Terayama | G06F 3/0647 |
| | | | | 711/16 |
| 9,128,636 | B2 ‡ | 9/2015 | Arakawa | G06F 3/067 |
| 9,575,659 | B2 ‡ | 2/2017 | Coronado | G06F 3/0685 |
| 9,996,562 | B2 ‡ | 6/2018 | Higginson | G06F 16/214 |
| 10,922,268 | B2 ‡ | 2/2021 | Hardy | G06F 3/0685 |
| 11,016,691 | B2 | 5/2021 | Zhang et al. | |
| 2008/0235300 | A1 ‡ | 9/2008 | Nemoto | G06F 16/119 |
| 2011/0202732 | A1 ‡ | 8/2011 | Montgomery | G06F 3/0647 |
| | | | | 711/15 |
| 2012/0036327 | A1 ‡ | 2/2012 | Jennas, II | G06F 3/0685 |
| | | | | 711/13 |
| 2012/0221684 | A1 ‡ | 8/2012 | Ferris | H04L 67/28 |
| | | | | 709/21 |
| 2012/0303739 | A1 ‡ | 11/2012 | Ferris | H04L 69/329 |
| | | | | 709/21 |
| 2013/0073825 | A1 ‡ | 3/2013 | Terayama | G06F 3/0607 |
| | | | | 711/165 |
| 2015/0032961 | A1 ‡ | 1/2015 | Sanford | G06F 16/119 |
| | | | | 711/11 |
| 2017/0185314 | A1 ‡ | 6/2017 | Gensler, Jr. | G06F 3/0665 |
| 2020/0065392 | A1 ‡ | 2/2020 | Shuma | G06F 16/214 |
| 2020/0073955 | A1 ‡ | 3/2020 | Hardy | G06F 3/0631 |
| 2020/0241787 | A1 | 7/2020 | Zhang et al. | |
| 2021/0191643 | A1 | 6/2021 | Zhang et al. | |

FOREIGN PATENT DOCUMENTS

| | | | | |
|---|---|---|---|---|
| CN | 104937574 | A | ‡ 9/2015 | ........... G06F 3/0616 |
| CN | 104937574 | A | 9/2015 | |
| CN | 106570086 | A | ‡ 4/2017 | |
| CN | 106570086 | A | 4/2017 | |

OTHER PUBLICATIONS

Corrected Notice of Allowance from U.S. Appl. No. 16/118,367, dated Jan. 21, 2021.‡

List of IBM Patents Or Patent Applications Treated As Related.‡

Notice of Allowance from U.S. Appl. No. 16/118,367, dated Oct. 9, 2020.‡

Zhang et al., U.S. Appl. No. 17/129,458, filed Dec. 21, 2020.‡

Anonymous, "Method and System for Providing Virtual Defragmentation of Extremely Large Volumes," IP.com Prior Art Database Technical Disclosure, No. IPCOM000235456D, Feb. 28, 2014, pp. 1-3.‡

Hardy et al., U.S. Appl. No. 16/118,367, filed Aug. 30, 2018.‡

Anonymous, "Method for enhanced application performance and improved load balancing considerations in multi-tier storage environment," IP.com Prior Art Database Technical Disclosure, No. IPCOM000250728D, Aug. 29, 2017, pp. 1-7.‡

Anonymous, "Reducing Memory Management Activity in a Virtual Machine through the use of Internal Object Pools," IP.com Prior Art Database Technical Disclosure, No. IPCOM000251646D, Nov. 21, 2017, pp. 1-7.‡

Anonymous, "System and Method to provision & share storage across Shared Storage Pool Tiers," IP.com Prior Art Database Technical Disclosure, No. IPCOM000240358D, Jan. 26, 2015, pp. 1-5.‡

IBM, "SVC Volume Migration," IBM White paper, 2004, pp. 1-52.‡

International Search Report and Written Opinion from PCT Application No. PCT/IB2020/050435, dated Jun. 15, 2020.‡

Hardy et al., U.S. Appl. No. 16/563,072, filed Sep. 6, 2019.‡

Hardy et al., U.S. Appl. No. 16/563,109, filed Sep. 6, 2019.‡

Zhang et al., U.S. Appl. No. 17/198,054, filed Mar. 10, 2021.‡

Zhang et al., U.S. Appl. No. 16/258,211, filed Jan. 25, 2019.

Restriction Requirement from U.S. Appl. No. 16/258,211, dated Jan. 28, 2020.

Non-Final Office Action from U.S. Appl. No. 16/258,211, dated Apr. 8, 2020.

Final Office Action from U.S. Appl. No. 16/258,211, dated Jun. 24, 2020.

Notice of Allowance from U.S. Appl. No. 16/258,211, dated Aug. 6, 2020.

Corrected Notice of Allowance from U.S. Appl. No. 16/258,211, dated Feb. 9, 2021.

Corrected Notice of Allowance from U.S. Appl. No. 16/258,211, dated Mar. 23, 2021.

Notice of Allowance from U.S. Appl. No. 16/258,211, dated Jan. 22, 2021.

Examination Report from European Application No. GB2111577.9, dated Aug. 27, 2021.

Non-Final Office Action from U.S. Appl. No. 17/198,054, dated Apr. 19, 2022.

Final Office Action from U.S. Appl. No. 17/198,054, dated Jul. 28, 2022.

Zhang et al., U.S. Appl. No. 17/863,077, filed Jul. 12, 2022, 52 pages.

‡ imported from a related application

MIGRATING DATA FROM A LARGE EXTENT POOL TO A SMALL EXTENT POOL

BACKGROUND

The present invention relates to data migration, and more specifically, this invention relates to migrating data from a first extent pool to a second extent pool with a smaller granularity than the first extent pool.

Extent pools in storage products may have different extent sizes. For example, a 1 GB extent size may be implemented for a large extent pool and a 16 MB extent size may be implemented for a small extent pool. Some workloads may perform better in a small extent pool when compared to a large extent pool. However, current methods to transfer data are expensive, and involve using a host to copy the data or implementing a flash copy. There is therefore a need to efficiently migrate volumes from large extent pools to small extent pools.

SUMMARY

A computer-implemented method according to one embodiment includes identifying a request to migrate data associated with a volume from a source storage pool to a destination storage pool, identifying volume segment table (VST) entries corresponding to rank extents within the source storage pool containing the data, allocating and synchronizing small VSTs for the identified VST entries within the volume, allocating one or more rank extents within the destination storage pool, transferring the data associated with the volume from the rank extents within the source storage pool containing the data to the one or more rank extents in the one or more ranks of the destination storage pool, updating the small VSTs to correspond to the transferred data in the one or more rank extents in the one or more ranks of the destination storage pool, and freeing the data from the one or more rank extents within the source storage pool.

In this way, data is migrated from a source storage pool to a destination storage pool having a rank extent size smaller than the rank extent size of the source storage pool. This may improve a performance of applications accessing the data in the destination storage pool, as the applications may perform better when utilizing smaller rank extents.

According to another embodiment, a computer program product for migrating data from a large extent pool to a small extent pool includes a computer readable storage medium having program instructions embodied therewith, where the program instructions are executable by a processor to cause the processor to perform a method including identifying, utilizing the processor, a request to migrate data associated with a volume from a source storage pool to a destination storage pool, identifying, utilizing the processor, VST entries corresponding to rank extents within the source storage pool containing the data, allocating and synchronizing, utilizing the processor, small VSTs for each of the identified VST entries within the volume, allocating, utilizing the processor, one or more rank extents within the destination storage pool, transferring, utilizing the processor, the data associated with the volume from the rank extents within the source storage pool containing the data to the one or more rank extents in the one or more ranks of the destination storage pool, updating, utilizing the processor, the small VSTs to correspond to the transferred data in the one or more rank extents in the one or more ranks of the destination storage pool, and freeing, utilizing the processor, the data from the one or more rank extents within the source storage pool.

Other aspects and embodiments of the present invention will become apparent from the following detailed description, which, when taken in conjunction with the drawings, illustrate by way of example the principles of the invention.

DETAILED DESCRIPTION

Figure 1:
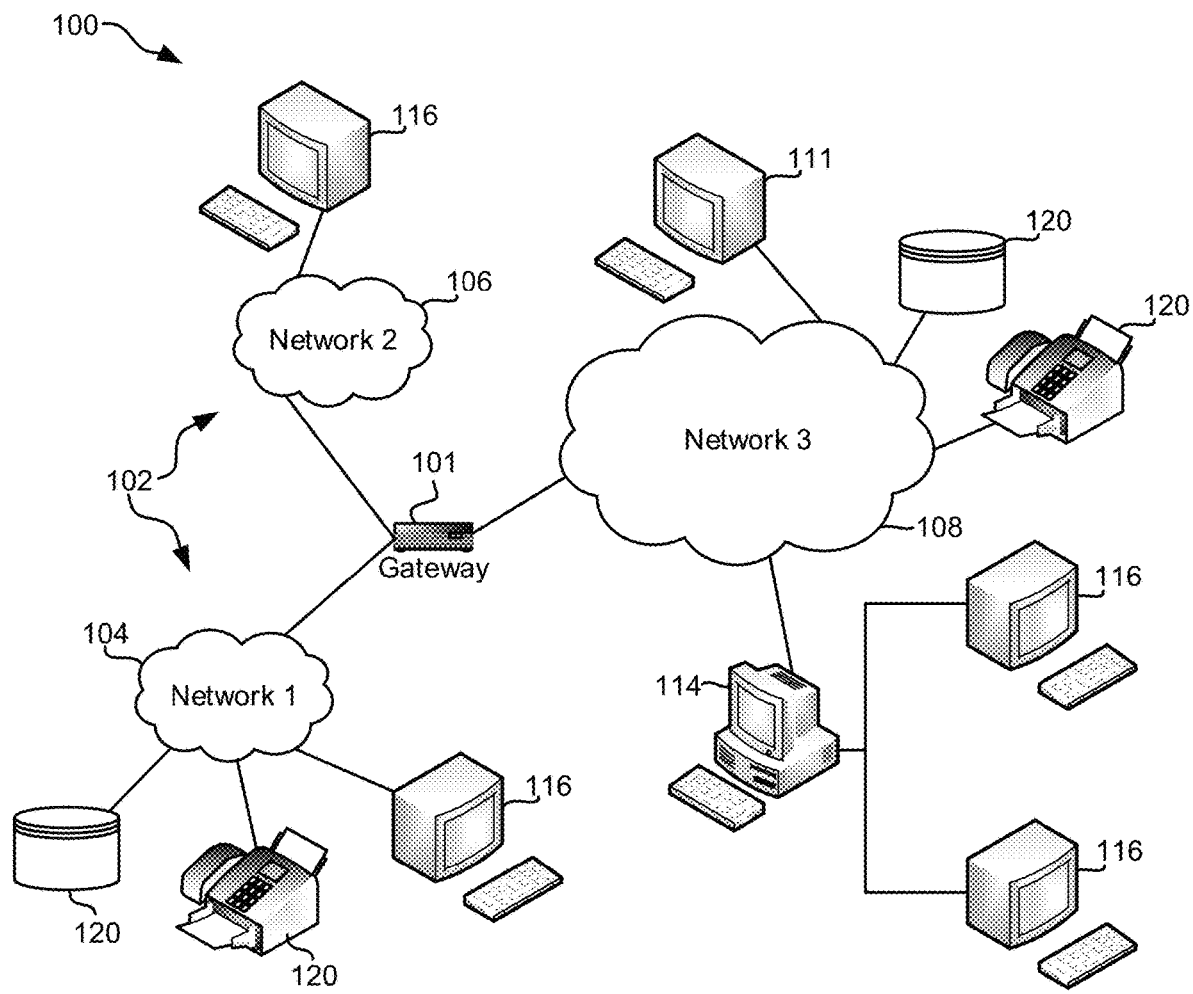
FIG. 1 illustrates a network architecture, in accordance with one embodiment.

The following description discloses several preferred embodiments of systems, methods and computer program products for migrating data from a large extent pool to a small extent pool. Various embodiments provide a method to create a correspondence between logical volume extents of the volume and physical offset locations within rank extents of the source storage pool, and migrate data from one or more ranks of the source storage pool to one or more ranks of the destination storage pool, utilizing the correspondence.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for migrating data from a large extent pool to a small extent pool.

In one general embodiment, a computer-implemented method includes identifying a request to migrate data associated with a volume from a source storage pool having a first rank extent size to a destination storage pool having a second rank extent size smaller than the first rank extent size, creating a correspondence between logical volume extents of the volume and physical offset locations within rank extents of the source storage pool, and migrating data from one or more ranks of the source storage pool to one or more ranks of the destination storage pool, utilizing the correspondence between the logical volume extents of the volume and the physical offset locations within the rank extents of the source storage pool.

In this way, data is migrated from a source storage pool to a destination storage pool having a rank extent size smaller than the rank extent size of the source storage pool without having to use a host to copy the data or implement a flash copy. This reduces an amount of time and resources of one or more systems performing the data migration, which improves a performance of the one or more systems.

In another general embodiment, creating the correspondence includes identifying VST entries within the volume that correspond to rank extents within the source storage pool that contain the data to be migrated, and creating a small VST for each identified VST entry.

In another general embodiment, a computer program product for migrating data from a large extent pool to a small extent pool includes a computer readable storage medium that has program instructions embodied therewith, where the computer readable storage medium is not a transitory signal per se, and where the program instructions are executable by a processor to cause the processor to perform a method including identifying, utilizing the processor, a request to migrate data associated with a volume from a source storage pool having a first rank extent size to a destination storage pool having a second rank extent size smaller than the first rank extent size, creating, utilizing the processor, a correspondence between logical volume extents of the volume and physical offset locations within rank extents of the source storage pool, and migrating, utilizing the processor, data from one or more ranks of the source storage pool to one or more ranks of the destination storage pool, utilizing the correspondence between the logical volume extents of the volume and the physical offset locations within the rank extents of the source storage pool.

In another general embodiment, a system includes a processor, and logic integrated with the processor, executable by the processor, or integrated with and executable by the processor, where the logic is configured to identify a request to migrate data associated with a volume from a source storage pool having a first rank extent size to a destination storage pool having a second rank extent size smaller than the first rank extent size, create a correspondence between logical volume extents of the volume and physical offset locations within rank extents of the source storage pool, and migrate data from one or more ranks of the source storage pool to one or more ranks of the destination storage pool, utilizing the correspondence between the logical volume extents of the volume and the physical offset locations within the rank extents of the source storage pool.

In another general embodiment, a computer-implemented method includes identifying a request to migrate data associated with a volume from a source storage pool to a destination storage pool, identifying volume segment table (VST) entries corresponding to rank extents within the source storage pool containing the data, allocating and synchronizing small VSTs for the identified VST entries within the volume, allocating one or more rank extents within the destination storage pool, transferring the data associated with the volume from the rank extents within the source storage pool containing the data to the one or more rank extents in the one or more ranks of the destination storage pool, updating the small VSTs to correspond to the transferred data in the one or more rank extents in the one or more ranks of the destination storage pool, and freeing the data from the one or more rank extents within the source storage pool.

In this way, data is migrated from a source storage pool to a destination storage pool having a rank extent size smaller than the rank extent size of the source storage pool. This may improve a performance of applications accessing the data in the destination storage pool, as the applications may perform better when utilizing smaller rank extents.

In another general embodiment, a computer program product for migrating data from a large extent pool to a small extent pool includes a computer readable storage medium having program instructions embodied therewith, where the computer readable storage medium is not a transitory signal per se, and where the program instructions are executable by a processor to cause the processor to perform a method including identifying, utilizing the processor, a request to migrate data associated with a volume from a source storage pool to a destination storage pool, identifying, utilizing the processor, VST entries corresponding to rank extents within the source storage pool containing the data, allocating and synchronizing, utilizing the processor, small VSTs for each of the identified VST entries within the volume, allocating, utilizing the processor, one or more rank extents within the destination storage pool, transferring, utilizing the processor, the data associated with the volume from the rank extents within the source storage pool containing the data to the one or more rank extents in the one or more ranks of the destination storage pool, updating, utilizing the processor, the small VSTs to correspond to the transferred data in the one or more rank extents in the one or more ranks of the destination storage pool, and freeing, utilizing the processor, the data from the one or more rank extents within the source storage pool.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
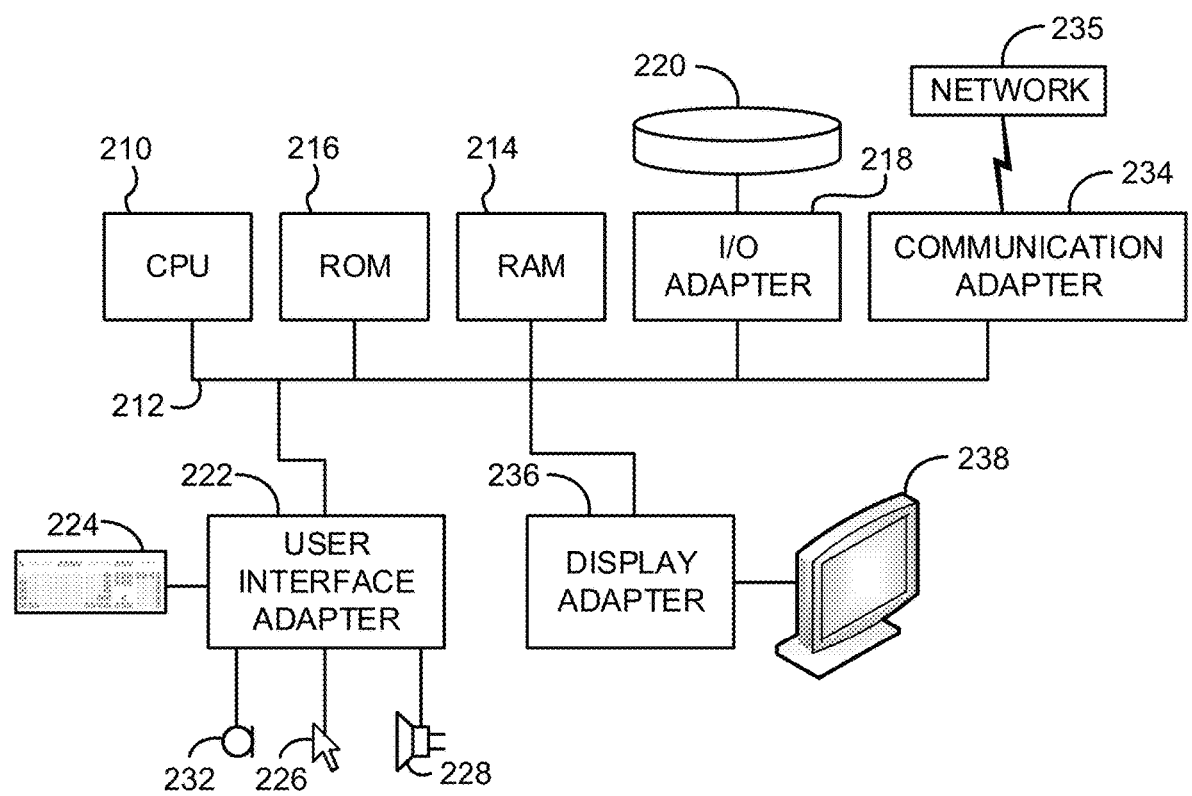
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
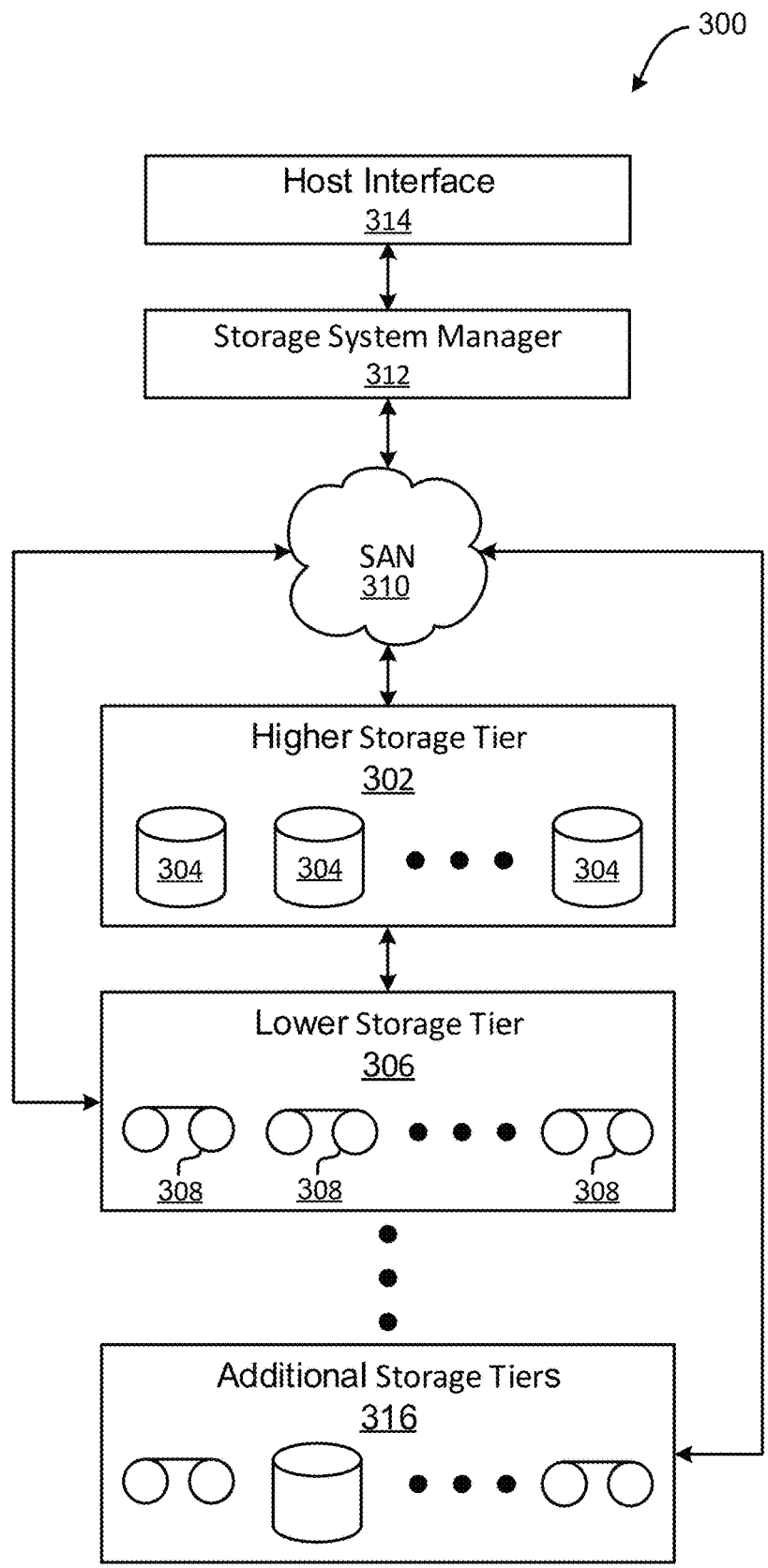
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
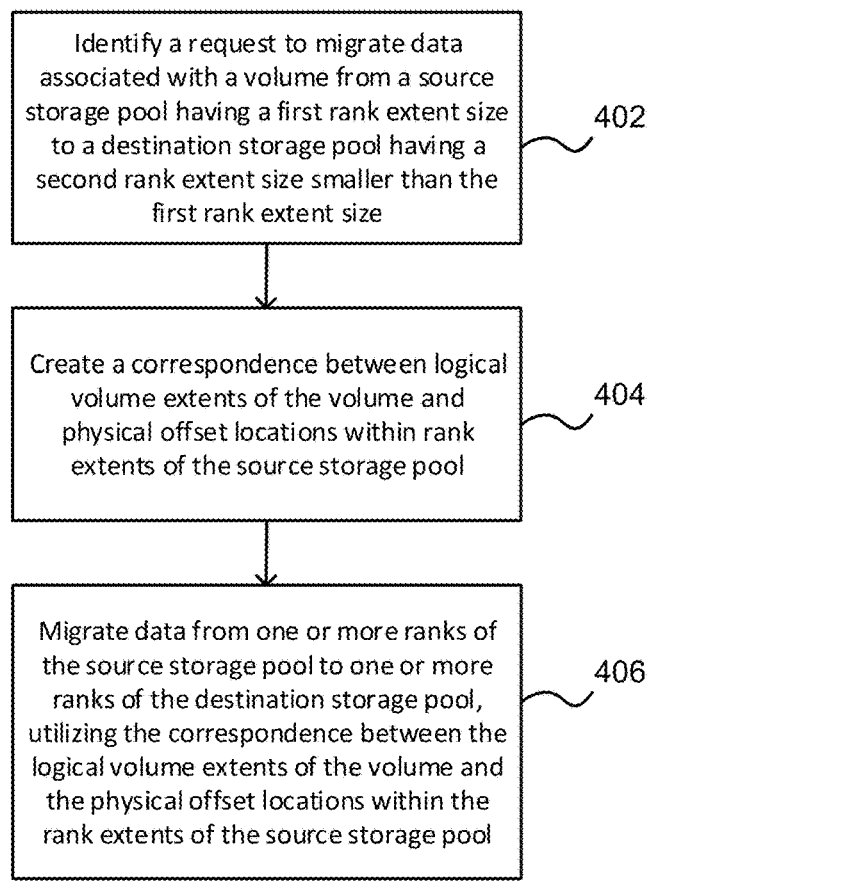
FIG. 4 illustrates a method for migrating data from a large extent pool to a small extent pool, in accordance with one embodiment.

Now referring to FIG. 4, a flowchart of a method 400 is shown according to one embodiment. The method 400 may be performed in accordance with the present invention in any of the environments depicted in FIGS. 1-3 and 6A-D, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received to migrate data associated with a volume from a source storage pool having a first rank extent size to a destination storage pool having a second rank extent size smaller than the first rank extent size.

Additionally, method 400 may proceed with operation 404, where a correspondence is created between logical volume extents of the volume and physical offset locations within rank extents of the source storage pool. In one embodiment, creating the correspondence includes identifying VST entries within the volume that correspond to rank extents within the source storage pool that contain the data to be migrated. For example, a VST may store a logical representation of data stored within the volume, where the VST includes a plurality of entries. A subset of these entries may be identified within the VST that correspond to rank extents within the source storage pool that contain the data to be migrated.

Further, in one embodiment, creating the correspondence may include creating a small VST for each identified VST entry. For example, for each of the identified subset of VST entries, a small VST may be created. In another example, each of the small VSTs may be used to represent all of the logical volume extents within their corresponding VST entry at a higher granularity.

Further, in one embodiment, creating the correspondence may include setting the logical volume extents within the small VSTs to point to corresponding offset locations within the rank extents within the source storage pool that contain the data to be migrated. In this way, a direct correspondence may be established between the logical volume extents of the small VSTs of the volume and the offset locations within the rank extents within the source storage pool that contain the data to be migrated.

Further still, method 400 may proceed with operation 406, where data is migrated from one or more ranks of the source storage pool to one or more ranks of the destination storage pool, utilizing the correspondence between the logical volume extents of the volume and the physical offset locations within the rank extents of the source storage pool. In one embodiment, migrating the data may include selecting a plurality of rank extents within the destination storage pool to receive the migrated data. For example, the plurality of rank extents may be selected randomly or according to one or more criteria (e.g., a rank numbering, a data retrieval speed of a corresponding rank, an amount of data currently being stored in the corresponding rank, etc.).

Also, in one embodiment, migrating the data may include transferring the data associated with the volume from one or more offset locations within the rank extents of the source storage pool to the selected plurality of rank extents within the destination storage pool.

In addition, in one embodiment, migrating the data may include freeing the data from the one or more rank extents within the source storage pool. In another embodiment, migrating the data may include adjusting the volume extents within the small VSTs to point to the corresponding locations of the migrated data within the selected plurality of rank extents of the destination storage pool that store the transferred data.

In this way, data is migrated from a source storage pool to a destination storage pool having a rank extent size smaller than the rank extent size of the source storage pool without having to use a host to copy the data or implement a flash copy. This reduces an amount of time and resources of one or more systems performing the data migration, which improves a performance of the one or more systems.

Figure 5:
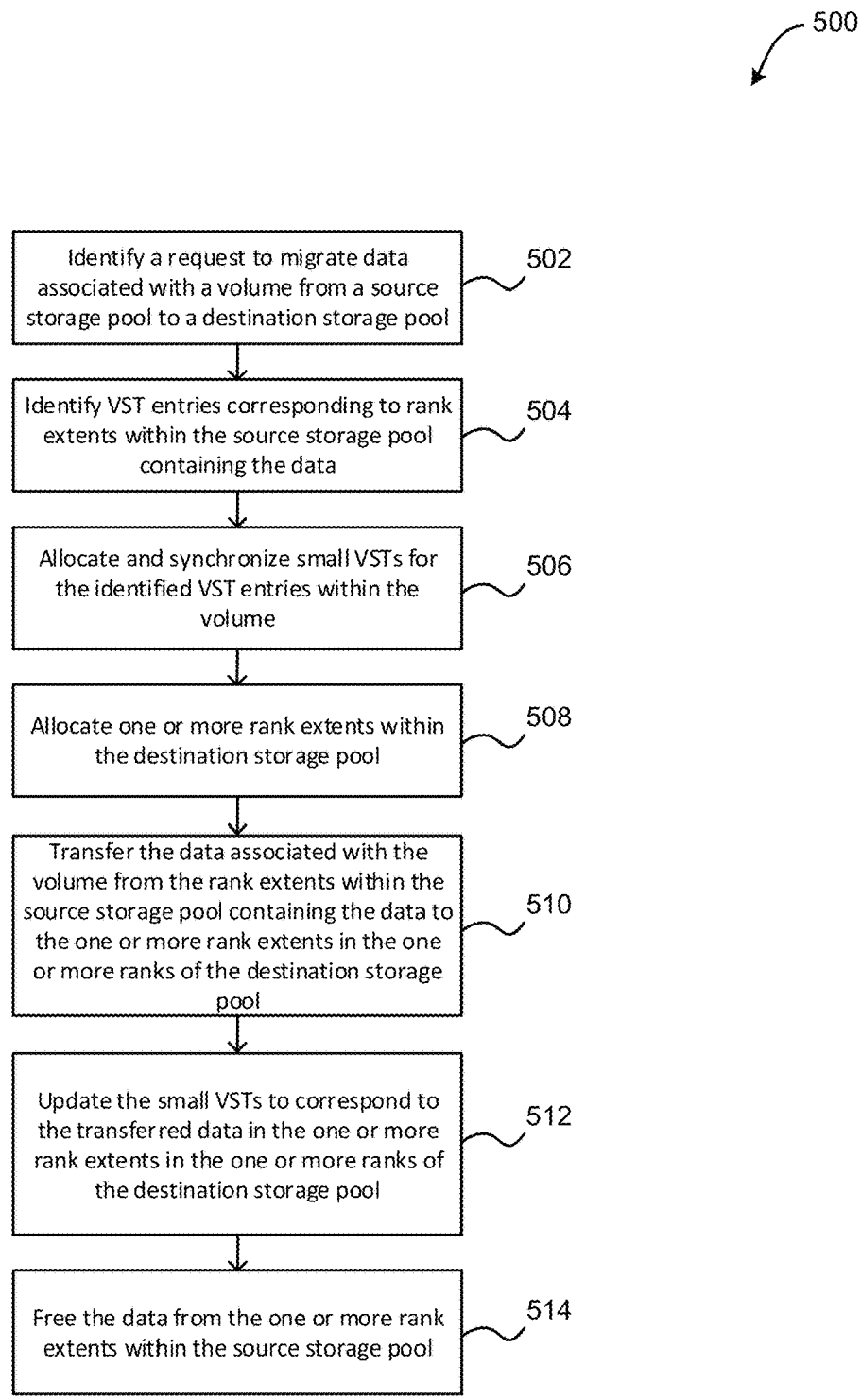
FIG. 5 illustrates a method for migrating data from a source storage pool to a destination storage pool having a smaller extent granularity than the source pool, in accordance with one embodiment.

Now referring to FIG. 5, a flowchart of a method 500 for migrating data from a source storage pool to a destination storage pool having a smaller extent granularity than the source pool is identified is shown according to one embodiment. The method 500 may be performed in accordance with the present invention in any of the environments depicted in FIGS. 1-3 and 6A-D, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to migrate data associated with a volume from a source storage pool to a destination storage pool is identified. In one embodiment, the volume includes a storage volume that organizes and presents a logical representation of the data in a contiguous manner to one or more hosts. In another embodiment, the volume includes a plurality of volume extents. For example, each volume extent may include a logical extent.

Additionally, in one embodiment, a storage pool includes one or more ranks. In another embodiment, each rank includes a redundant amount of storage (e.g., a RAID storage array, etc.). In yet another embodiment, data logically represented in the volume is physically stored in one or more ranks of a storage pool. For example, in one embodiment, each rank includes a plurality of rank extents.

Further, in one embodiment, the extents within a rank are represented as entries within a rank segment table (RST) for the rank, where each rank extent is either full or empty. For example, each rank extent represents a physical extent. In another example, each rank extent represents a predetermined amount of storage for storing data within the storage pool. In yet another example, full rank extents include a logical location of data within the volume (e.g., an identification of a volume and a volume extent within that volume where the data is logically stored and presented to one or more hosts).

Further still, in one embodiment, the source storage pool includes one or more ranks that initially store all data logically represented in the volume. In another embodiment, the data logically represented in the volume is physically stored in multiple ranks within the source storage pool.

Also, in one embodiment, the source storage pool has a first rank extent size, and the destination storage pool has a second rank extent size smaller than the first rank extent size. For example, the source storage pool may have rank extents with a size of 1 GB, and the second extent pool may have rank extents with a size of 16 MB.

In addition, method 500 may proceed with operation 504, where VST entries corresponding to rank extents within the source storage pool containing the data are identified. In one embodiment, the volume extents are grouped within entries of a volume segment table (VST), where each volume extent is either full or empty. For example, in one embodiment, full volume extents include a physical location of data within the source storage pool (e.g., an identification of a rank and a rank extent within that rank where the data associated with the volume extent is stored). In another example, each entry of a VST includes a predetermined number of consecutive volume extents. In yet another example, the VST maps the logical extents of the volume (e.g., the volume extents) to physical extents of one or more ranks within a storage pool (e.g., rank extents).

Furthermore, method 500 may proceed with operation 506, where small VSTs are allocated and synchronized for the identified VST entries within the volume. In one embodiment, small VSTs represent and manage the entries of the VST with a higher granularity. For example, each entry of the VST includes a grouped plurality of volume extents identified only by a VST entry number. In another example, a single VST entry may be represented by a small VST having entries corresponding to each of the plurality of volume extents grouped within the single VST entry.

Further still, in one embodiment, synchronizing the small VSTs may include setting the logical volume extents within each of the small VSTs to point to corresponding offset locations within the rank extents within the source storage pool that contain the data to be migrated. For example, the offset locations of a rank extent represent a logical rank extent number within a logical representation of the rank extent (e.g., that indicates a predetermined portion of the rank extent). In another example, a rank extent of size 1 GB may have a plurality of offset locations that each represent 16 MB portions of the rank extent (such that a single 1 GB rank extent would have sixty-four 16 MB offset locations, etc.). This allows for a representation of a rank extent at a higher granularity.

In another embodiment, synchronizing the small VSTs may include populating the small VSTs so that they include volume extents that contain offset locations within a corresponding rank extent within the source storage pool. In this way, the entries within the small VSTs are populated such that an organization (e.g., order, numbering, etc.) of entries within the small VSTs match an organization of offset locations within allocated rank extents corresponding to the small VSTs.

Also, method 500 may proceed with operation 508, where one or more rank extents are allocated within the destination storage pool. In one embodiment, a number of rank extents allocated within the destination storage pool corresponds to a size of the volume. For example, a total size of data logically represented by the volume is allocated within the destination storage pool. In another example, the total size of the data logically represented by the volume is divided by a rank extent size of the destination storage pool to determine a number of rank extents that are allocated within the destination storage pool. In another embodiment, the one or more rank extents are allocated randomly, serially, non-serially, etc.

Additionally, in one embodiment, the one or more rank extents may be allocated according to one or more criteria. For example, the one or more rank extents may be allocated based on a data retrieval speed of the ranks within the destination storage pool. For instance, each of the ranks may be listed in order of decreasing data retrieval speed, and extents may be allocated in ranks according to the list (e.g., starting with ranks having a fastest data retrieval speed, etc.).

In another example, the one or more rank extents may be allocated based on an amount of data of data currently being stored in each of the ranks within the destination storage pool. For instance, the ranks may be listed in order of a decreasing amount of currently available storage space, and extents may be allocated in ranks according to the list (e.g., starting with ranks having most currently available extents, etc.).

In addition, method 500 may proceed with operation 510, where the data associated with the volume is transferred from the rank extents within the source storage pool containing the data to the one or more rank extents in the one or more ranks of the destination storage pool. In one embodiment, transferring the data includes determining a location of all offset locations within the rank extents of one or more RSTs of the source storage pool that correspond to all previously allocated volume extents within the volume. In another embodiment, transferring the data includes determining all allocated rank extents within the destination storage pool.

Further still, in one embodiment, transferring the data includes transferring the data stored in the offset locations of the rank extents within the source storage pool to the corresponding allocated rank extents within the destination storage pool. For example, data stored in an offset location of a rank extent of a rank of the source storage pool is transferred to an allocated rank extent of the destination storage pool.

Also, method 500 may proceed with operation 512, where the small VSTs are updated to correspond to the transferred data in the one or more rank extents in the one or more ranks of the destination storage pool. For example, volume extents are adjusted within small VSTs of the volume to point to the corresponding locations within the allocated one or more rank extents of the destination storage pool that store the transferred data.

Additionally, method 500 may proceed with operation 514, where the data is freed from the one or more rank extents within the source storage pool. In one embodiment, freeing the data may include deleting the data from the one or more rank extents within the source storage pool.

For example, a volume extent within a small VST originally identifies an offset location within a logical representation of a rank extent in the source storage pool where the data logically represented by that volume extent is physically stored. In another example, the volume extent is updated within the small VST to identify the allocated rank extent of the destination storage pool where the data associated with the volume extent was migrated. In yet another example, the stored data is migrated from the offset location within the logical representation of the rank extent in the source storage pool to an allocated rank extent of the destination storage pool.

In this way, volume extents within the small VSTs of the volume match the allocated rank extents in the destination storage pool where data associated with those volume extents is stored. For example, a location of a volume extent within a small VST of the volume matches an allocated rank extent where data for the entry is stored. This simplifies and expedites data recall within the destination storage pool.

In one embodiment, one or more applications are provided access to the data at the destination storage pool. For example, one or more applications running on one or more hosts may send one or more data requests to the volume, and the volume may direct the data requests to the destination storage pool to implement data access. In another embodiment, the one or more applications may run more efficiently when accessing data using the smaller rank extent granularity within the destination storage pool compared to the larger rank extent granularity within the source storage pool.

In this way, data is migrated from a source storage pool to a destination storage pool having a rank extent size smaller than the rank extent size of the source storage pool. This may improve a performance of applications accessing the data in the destination storage pool, as the applications may perform better when utilizing smaller rank extents.

Figure 6A:
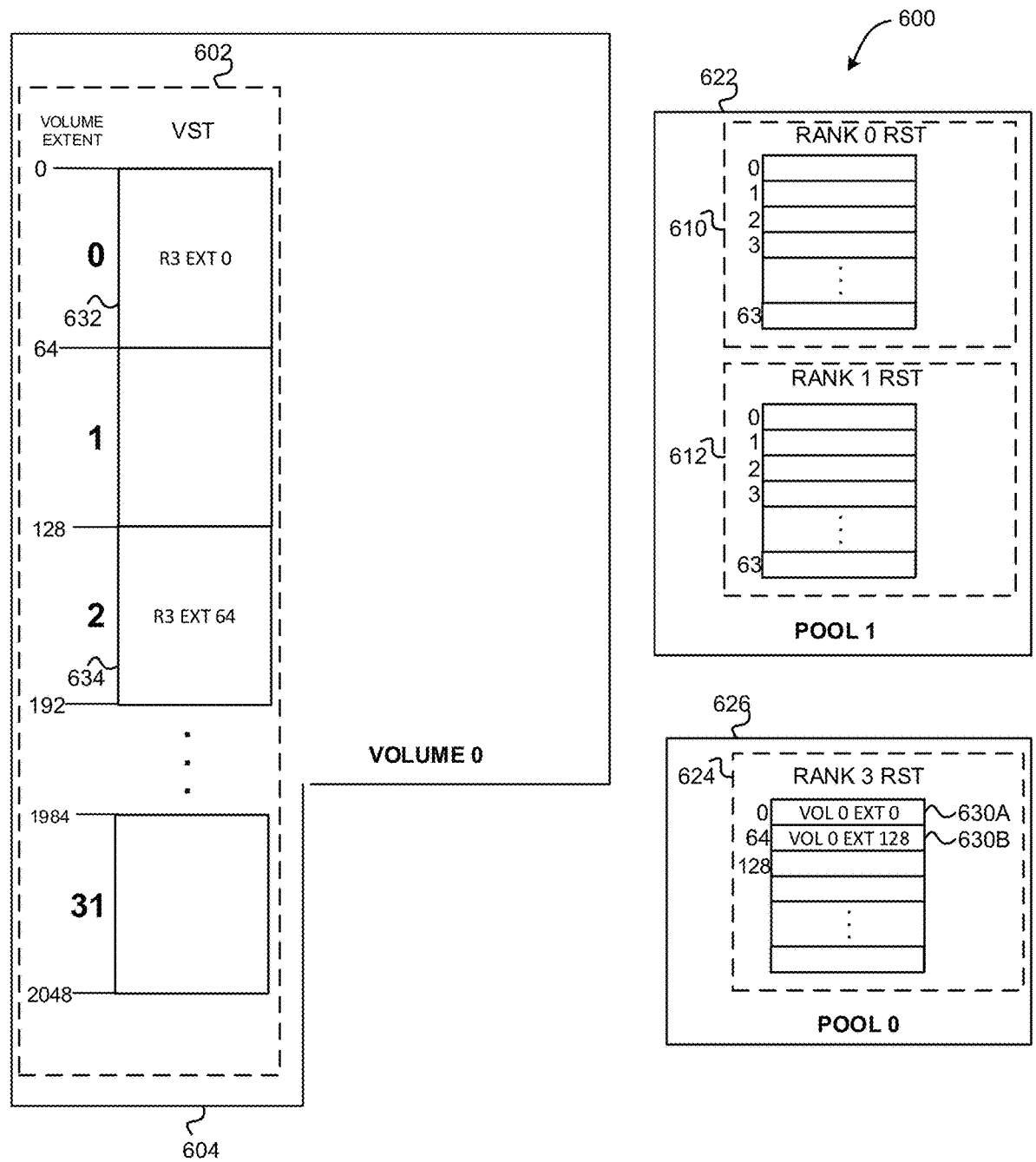
FIG. 6A illustrates an exemplary storage environment prior to a data migration, in accordance with one embodiment.

FIG. 6A illustrates an exemplary storage environment 600 prior to a data migration, according to one embodiment. As shown, a VST 602 stores a logical representation of data stored within a volume 0 604. Additionally, RSTs store a physical representation of the data as stored within a rank 3 624 of a source pool 0 626. Also, the rank granularity of source pool 0 626 is 1 GB. For example, each rank extent within source pool 0 626 has a size of 1 GB.

Further, full volume extent VST entries 632 and 634 refer to locations 630A-B within the RSTs where data is physically stored within source pool 0 626. For example, rank extent 0 630A of rank 3 624 of source pool 0 626 includes a link to VST entry 0 632 within volume 0 604. Conversely, VST entry 0 632 within volume 0 604 includes a link to rank extent 0 630A of rank 3 624 of source pool 0 626.

Likewise, rank extent 64 630B of rank 3 624 of source pool 0 626 includes a link to VST entry 2 634 within volume 0 604. Conversely, VST entry 2 634 within volume 0 604 includes a link to rank extent 64 630B of rank 3 624 of source pool 0 626.

In this way, a connection between a logical representation of data in volume 0 604 is mapped to a physical representation of data in source pool 0 626.

Figure 6B:
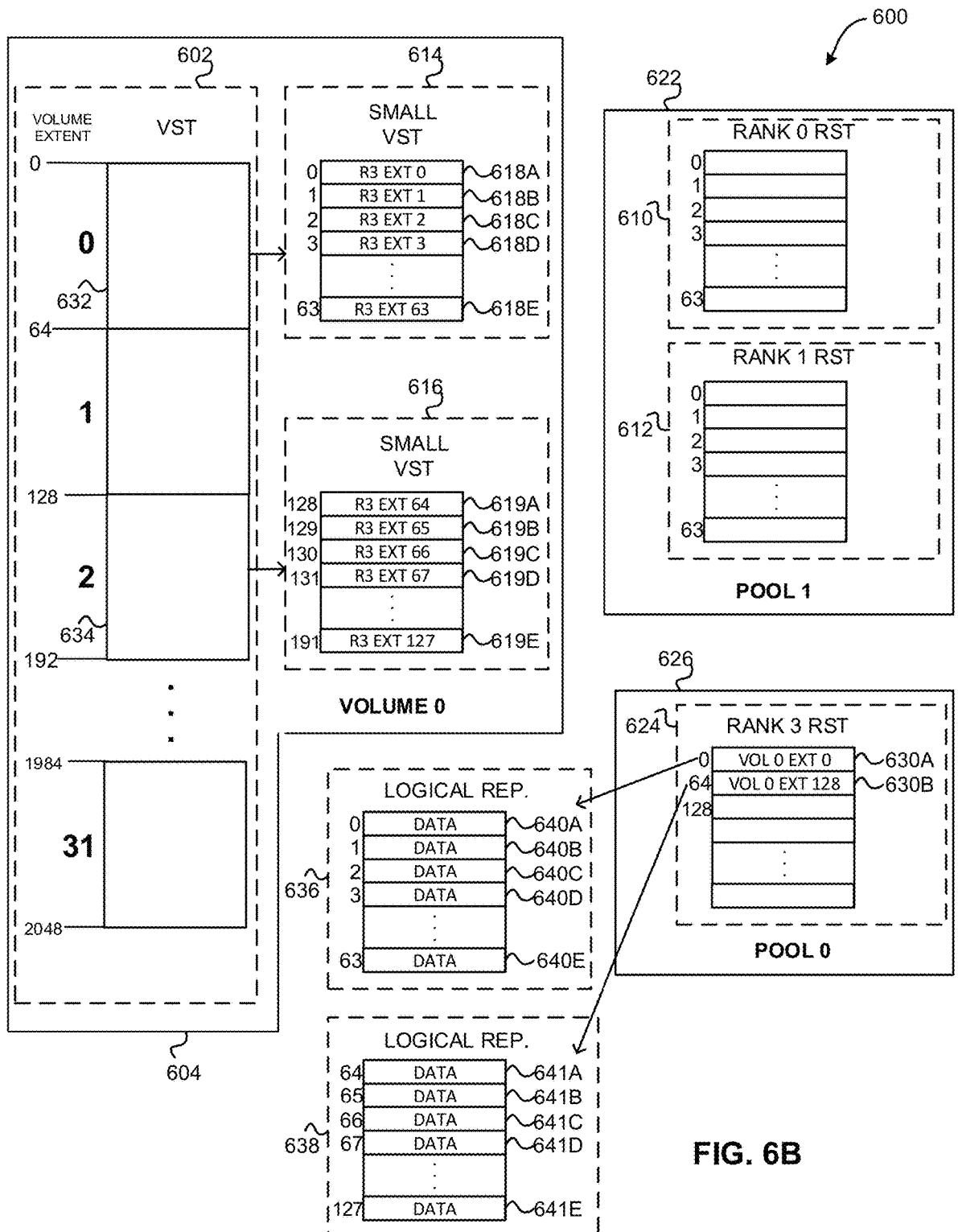
FIG. 6B illustrates an exemplary storage environment in response to a migration request, in accordance with one embodiment.

FIG. 6B illustrates an exemplary storage environment 600 in response to a migration request, according to one embodiment. The rank granularity of a destination pool 1 622 is 16 MB. For example, each rank extent within the destination pool 1 622 has a size of 16 MB. Since the rank granularity of the source pool 0 626 is 1 GB, the destination pool 1 622 has a smaller rank granularity than the source pool 0 626.

In one embodiment, a request is received to migrate data from source pool 0 626 to destination pool 1 622. In another embodiment, in response to the migration request, small VSTs 614 and 616 are created within volume 0 604. For example, small VSTs 614 and 616 are used to represent the volume extents within VST entry 0 632 and VST entry 2 634, respectively.

Additionally, in one embodiment, extents 618A-E and 619A-E within small VSTs 614 and 616 are updated to include links to corresponding offset locations 640A-E and 641A-E of allocated rank extents 630A and 630B. Logical representations 636 and 638 of offset locations 640A-E and 641A-E of allocated rank extents 630A and 630B are shown. For example, volume extent 0 618A of small VST 614 may be updated to point to offset location 0 640A of logical representation 636 of allocated rank extent 0 630A, volume extent 1 618B of small VST 614 may be updated to point to offset location 1 640B of logical representation 636 of allocated rank extent 0 630A, etc.

In this way, a correlation may be made between the extents 618A-E and 619A-E within small VSTs 614 and 616 and offset locations 640A-E and 641A-E of allocated rank extents 630A and 630B.

Figure 6C:
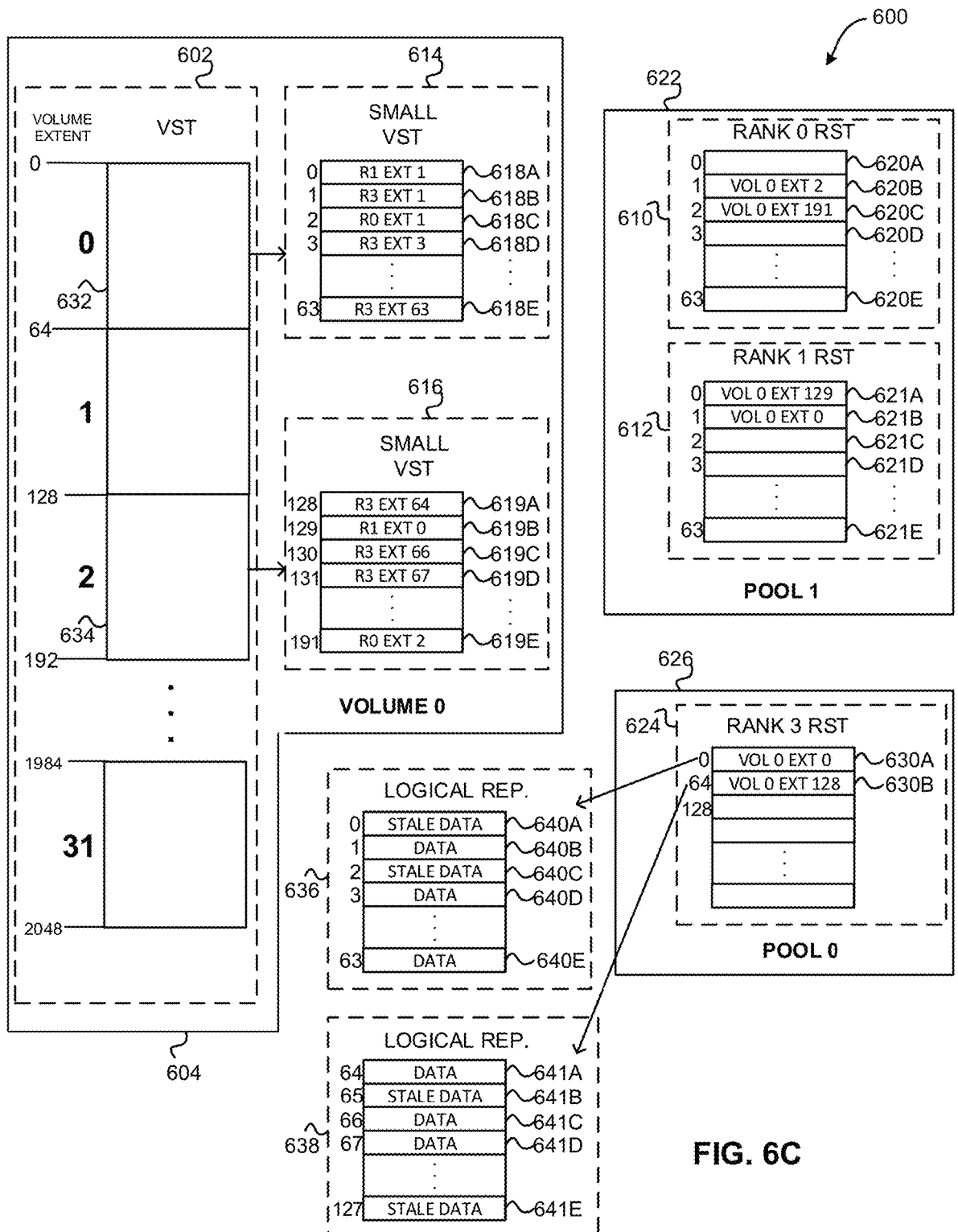
FIG. 6C illustrates an exemplary storage environment during a data migration from a source pool to a destination pool, in accordance with one embodiment.

FIG. 6C illustrates an exemplary storage environment 600 during a data migration from a source pool 0 626 to a destination pool 1 622, according to one embodiment. As shown, rank extents 620A-E and 621A-E are allocated within destination rank 0 610 and destination rank 1 612 in the destination pool 1 622. It should be noted that although the allocated rank extents 620A-E and 621A-E are serial, allocation may not be performed serially.

Additionally, although destination rank 0 610 and destination rank 1 612 are shown, rank extents from other ranks within the destination pool 622 may be allocated. For example, rank extents may be allocated amongst ranks within the destination pool 622 randomly, according to a data retrieval speed of the ranks, according to an amount of data currently being stored in the ranks, etc.

Further, as shown, data physically stored in offset location 0 640A of rank 0 630A of rank 3 624 has been transferred to rank extent 1 621B of destination rank 1 612, and volume extent 0 618A of the small VST 614 is updated to point to rank extent 1 621B. Conversely, rank extent 1 621B of destination rank 1 612 of source pool 1 622 is updated to include a link to volume extent 0 618A within volume 0 604. This results in stale data at offset location 0 640A.

Similarly, as shown, data physically stored in offset location 2 640C has been transferred to rank extent 1 620B of destination rank 0 610, and volume extent 2 618C of the small VST 614 is updated to point to rank extent 1 620B. Conversely, rank extent 1 620B of destination rank 0 610 of source pool 1 622 is updated to include a link to volume extent 2 618C within volume 0 604. This results in stale data at offset location 2 640C.

Further, as shown, data physically stored in offset location 65 641B has been transferred to rank extent 0 621A of destination rank 1 612, and volume extent 129 619B of the small VST 616 is updated to point to rank extent 0 621A. Conversely, rank extent 0 621A of destination rank 1 612 of source pool 1 622 is updated to include a link to volume extent 129 619B within volume 0 604. This results in stale data at offset location 65 641B.

Also, as shown, data physically stored in offset location 127 641E has been transferred to rank extent 2 620C of destination rank 0 610, and volume extent 191 619E of the small VST 616 is updated to point to rank extent 2 620C. Conversely, rank extent 2 620C of destination rank 0 610 of source pool 1 622 is updated to include a link to volume extent 191 619E within volume 0 604. This results in stale data at offset location 127 641E.

Figure 6D:
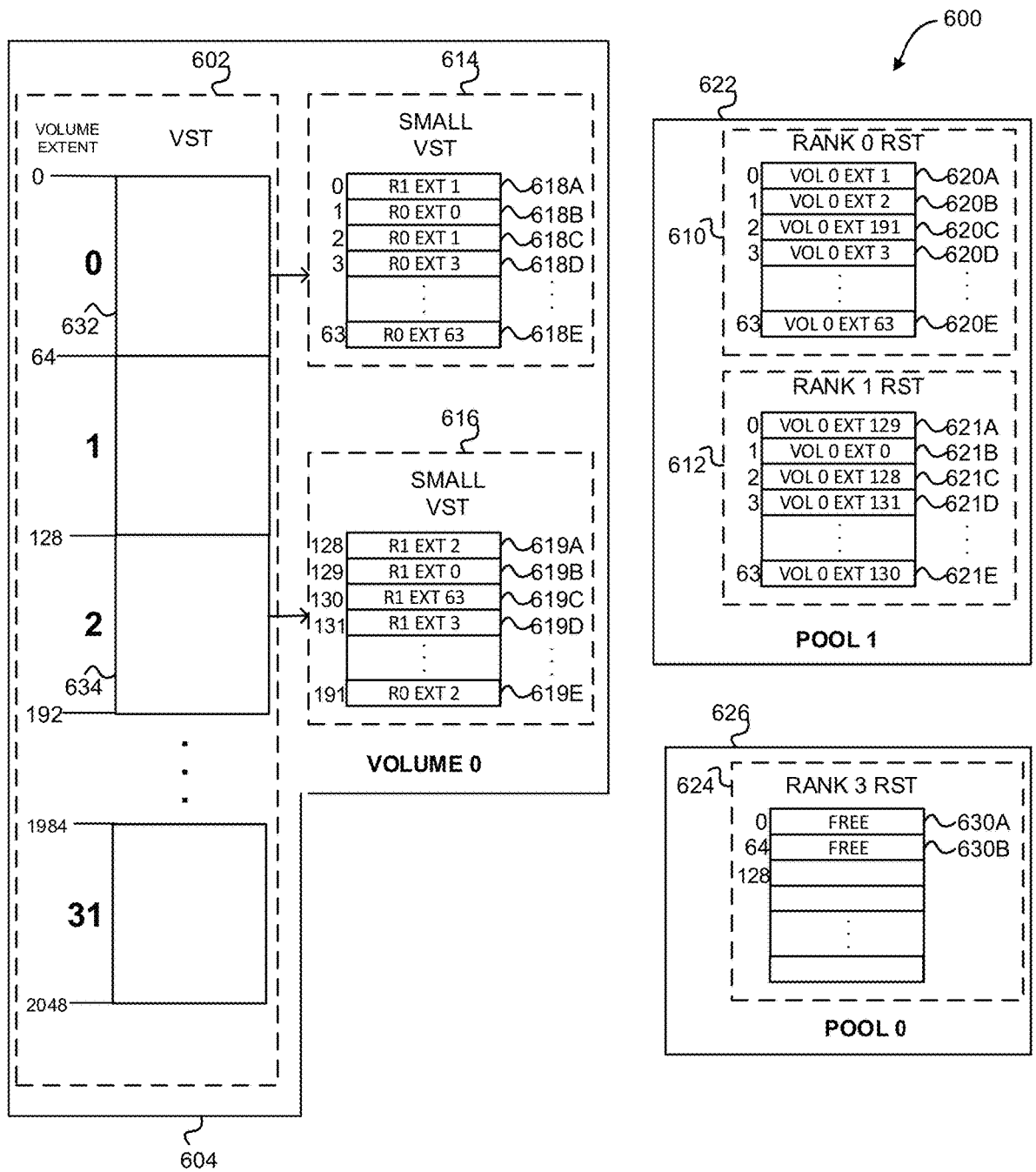
FIG. 6D illustrates an exemplary storage environment after a data migration from a source pool to a destination pool, in accordance with one embodiment.

FIG. 6D illustrates an exemplary storage environment 600 after a data migration from a source pool 0 626 to a destination pool 1 622, according to one embodiment. As shown, all data physically stored in rank extents 0 630A and 64 630B of source pool 0 626 is transferred to allocated rank extents within rank 0 610 and rank 1 612 of destination pool 1 622. Additionally, corresponding volume extents in small VSTs 614 and 616 are updated to point to the corresponding rank extents that now store the migrated data.

This results in stale data in all offset locations of rank extents 0 630A and 64 630B, and data in such rank extents 0 630A and 64 630B is freed as a result.

In this way, data may be migrated from the source pool 0 626 to the destination pool 1 622, and the volume 0 604 may be updated to reflect the migration.

Migration of Volumes from a Large Extent Pool to a Small Extent Pool

Extent pools in storage products could have different extent size. For example, DS8000 may use a 1 GB extent size for a large pool and a 16 MB for a small pool. Some workloads perform better using small pools, while others perform better in large extent pools. There is therefore a need to migrate volumes across different sized extent pools as the workload changes.

Extent migration is a building block of volume migration. At the beginning of extent migration, rank extents are allocated in the target extent pool as the migration target of the source extent. If the extent size is the source and target extent pool are same, the migration process includes allocating one extent in the target pool, migrating the data from a source to a target, holding backend I/O as migration is ongoing (or performing a mirror write), and switching I/O to the target once migration is complete.

A method is disclosed to migrate data from a large extent pool to a small extent pool in an efficient way, where migration is able to be resumed when it is interrupted (planned or unplanned).

In one embodiment, a Rank Segment Table (RST) is a mapping table for a rank (array) describing the state of rank extents and the logical volume extents that the physical rank extents belong to. For example, say rank r0 is 1T, and the extent size is 1 G, then this RST table would have 1024 entries, with each entry representing one physical extent. If rank extent 0 is allocated to logical extent 1 of volume 0×1010, then the entry in RST will have information indicating that the physical extent state is allocated, and it is allocated to logical extent 1 of volume 0×1010.

Additionally, in one embodiment, a Volume Segment Table (VST) is a mapping table for volumes that maps the logical extent of the volume to the physical extent of the rank, so that we can easily identify the physical location when host I/O arrives which is on a volume LBA boundary.

Further, in one embodiment, a Small Volume Segment Table (smVST) is also a mapping table for a volume that contains 64 entries with each entry map a small logical extent (16 MB) to the physical extent of the rank, so that we can easily identify a physical location when a host I/O arrives which is on a volume LBA boundary.

Further still, in one embodiment, only an RST is persistent in disks, and a VST is built and loaded into memory on demand based on the RST.

Also, in one embodiment, the following steps provide for extent migration from a large extent pool to a small extent pool:

1. Pre-check to make sure the migration request can be fulfilled.
2. Quiesce Thin Provisioning write if it is a Thin Provisioning volume.
3. Update volume extent pool ID to targeting extent pool, turn on volume flag to indicate space allocation in progress and harden the volume structure.
4. Allocate targeting RST objects for customer data.
5. As for Thin Provisioning volume, if the source large extent is already allocated, allocate 64 small extents in the targeting extent pool and marked them as DSR_TGT. If the source extent is not allocated, there is no need to allocate small extents in the target pool.
6. Allocate targeting RST objects for meta data.
7. Resume Thin Provisioning write if it is a Thin Provisioning volume.
8. Harden changed RST objects by using an RST changed bitmap.
9. Quiesce Thin Provisioning write if it is a Thin Provisioning volume.
10. Allocate smVST if all entries are in an unallocated state.
11. Send mail to peer LPAR to sync smVST (This step is valid only for ESE volumes).
12. Resume Thin Provisioning write if it is a Thin Provisioning volume.
13. Turn off a volume allocation flag, turn on a volume migration flag and harden a volume structure.
14. Proceed to migrate volume extents.
15. Find a small extent in DSR_TGT state in the target pool and pair it with the source small extent chunk to start small extent migration; hold I/O in 16 MB unit.
16. Switch to a metadata update phase once the 16 MB customer data from the source extent is all in the target.
17. Change and harden the state of target RST to TGT_CMPLT state.
18. Allocate a smVST if smVST does not yet exist.
19. Initialize smVST entries to point to the related small chunks in a source large extent.
20. Update smVST to point to the new target small extent on all available clusters.
21. Release all held stage & destage I/O.
22. CACHE SCAN to have CACHE destage all modified tracks in the extent.
23. Free the source extent if it is the last small chunk to migrate to the target, otherwise, go back to step 15 to handle the next small chunk.
24. Change and harden the state of target RST to an ALLOCATED state.

Method to Allocate Space and the Timing to Allocate/Update smVST Mapping Table

In one embodiment, space is pre-allocated in the targeting extent pool before migration starts. 1 GB large extent equals 64 16 MB small extents, so if the source large extent is allocated, there will be 64 small extents pre-allocated in the target pool. If the source large extent is not allocated yet, there is no need to provision space in the target pool either.

A smVST entry should be allocated for the 64 small extent chunks if the source is not allocated yet; that way, once I/O comes in writing to any of the 64 small extent chunks, we can allocate a small extent from the target small extent pool and update the smVST entry to point to the target small extent. The smVST update needs to be synced between storage nodes.

If the source large extent is in an allocated state, we can either still allocate the smVST beforehand, and update its entries to point to the related small chunks in the large extent, or delay the allocation of smVST to when the first 16 MB small chunk of the large extent has been migrated to the target small extent.

Method to Hold Backend I/O

In one embodiment, the backend I/O is held in a 16 MB small extent unit. During the migration of the 16 MB small chunk from the large extent to the related small extent in the target pool, backend I/O is written to both the source and target as migration is being performed from the source to target. Switching to a metadata update phase is performed once the customer data from the source small chunk is mostly in the target. Changing the target RST state to a TGT_CMPLT state indicates the copy is complete, and updating the related smVST entry is performed to point to the target extent so that I/O can be directed to the target afterwards.

Method to Handle Migration Interrupt Due to Planned/Unplanned Reboot

When migration is interrupted by a planned/unplanned reboot, part of the 1 GB data is in the source pool and the others are in the target pool. How do we choose which copy to use? How do we build the VST to map to the correct rank segments? In one embodiment, small always triumphs: The process may include scanning ranks and building a VST for each RST that's either in a TGT_CMPLT or ALLOCATED state. An RST from small ranks always overwrites an RST from large ranks. This is because the I/O has been switched to target a small extent if the small extent is already in a TGT_CMPLT or ALLOCATED state. Therefore, we need to overwrite the related smVST to point to the target small extent.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a request to migrate data associated with a volume from a source storage pool to a destination storage pool;
identifying volume segment table (VST) entries corresponding to rank extents within the source storage pool containing the data;
allocating and synchronizing small VSTs for the identified VST entries within the volume;
allocating one or more rank extents within the destination storage pool;
transferring the data associated with the volume from the rank extents within the source storage pool containing the data to the one or more rank extents in the one or more ranks of the destination storage pool;
updating the small VSTs to correspond to the transferred data in the one or more rank extents in the one or more ranks of the destination storage pool; and
freeing the data from the one or more rank extents within the source storage pool.

2. The computer-implemented method of claim 1, wherein the volume includes a storage volume that organizes and presents a logical representation of the data in a contiguous manner to one or more hosts.

3. The computer-implemented method of claim 1, wherein data logically represented in the volume is physically stored in one or more ranks of the source storage pool.

4. The computer-implemented method of claim 1, wherein the source storage pool has a first rank extent size, and the destination storage pool has a second rank extent size smaller than the first rank extent size.

5. The computer-implemented method of claim 1, wherein the small VSTs represent and manage the VST entries with a higher granularity.

6. The computer-implemented method of claim 1, wherein synchronizing the small VSTs includes setting logical volume extents within each of the small VSTs to point to corresponding offset locations within rank extents within the source storage pool that contain the data to be migrated.

7. The computer-implemented method of claim 1, wherein a number of rank extents allocated within the destination storage pool corresponds to a size of the volume.

8. The computer-implemented method of claim 1, wherein a total size of the data logically represented by the volume is divided by a rank extent size of the destination storage pool to determine a number of the rank extents that are allocated within the destination storage pool.

9. The computer-implemented method of claim 1, wherein the one or more rank extents are allocated based on a data retrieval speed of ranks within the destination storage pool.

10. The computer-implemented method of claim 1, wherein the one or more rank extents are allocated based on an amount of data of data currently being stored in each of a plurality of ranks within the destination storage pool.

11. The computer-implemented method of claim 1, wherein transferring the data includes transferring the data stored in offset locations of the rank extents within the source storage pool to corresponding allocated rank extents within the destination storage pool.

12. The computer-implemented method of claim 1, wherein each of the small VSTs represent all logical volume extents within their corresponding VST entry with a higher granularity.

13. The computer-implemented method of claim 1, wherein synchronizing the small VSTs includes populating the small VSTs so that they include volume extents that contain offset locations within a corresponding rank extent within the source storage pool.

14. A computer program product for migrating data from a large extent pool to a small extent pool, the computer program product comprising a computer readable storage medium having program instructions embodied therewith, the program instructions executable by a processor to cause the processor to perform a method comprising:

- identifying, utilizing the processor, a request to migrate data associated with a volume from a source storage pool to a destination storage pool;
- identifying, utilizing the processor, VST entries corresponding to rank extents within the source storage pool containing the data;
- allocating and synchronizing, utilizing the processor, small VSTs for each of the identified VST entries within the volume;
- allocating, utilizing the processor, one or more rank extents within the destination storage pool;
- transferring, utilizing the processor, the data associated with the volume from the rank extents within the source storage pool containing the data to the one or more rank extents in the one or more ranks of the destination storage pool;
- updating, utilizing the processor, the small VSTs to correspond to the transferred data in the one or more rank extents in the one or more ranks of the destination storage pool; and
- freeing, utilizing the processor, the data from the one or more rank extents within the source storage pool.

* * * * *